April 19, 1960 M. L. ENDERS 2,932,898
STRUCTURES USEFUL IN MICROMETER CALIPERS
Filed March 12, 1957 2 Sheets-Sheet 1
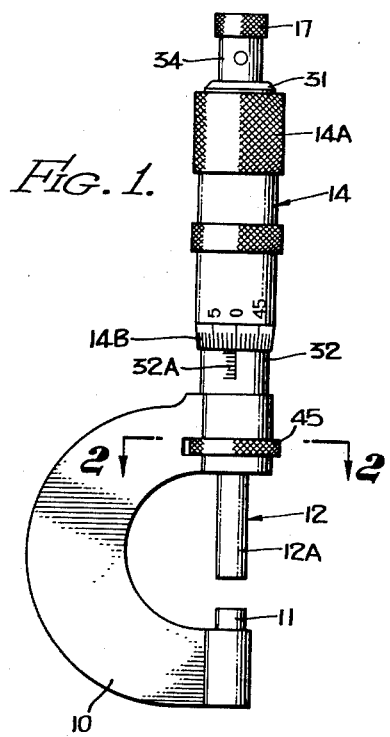
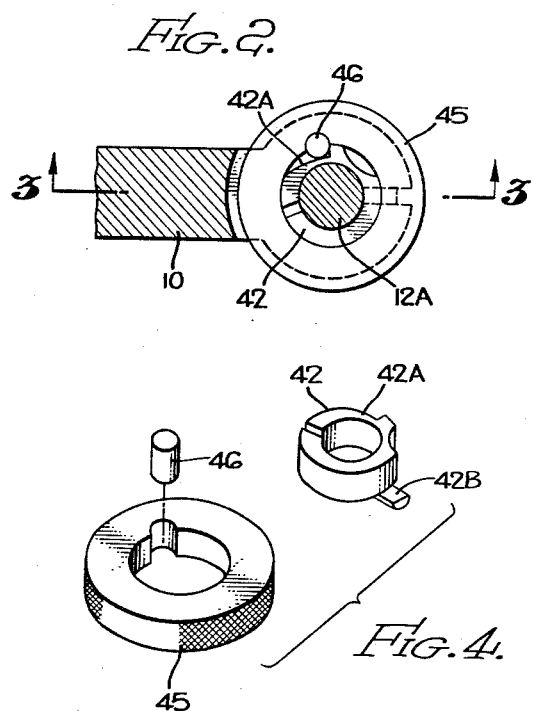
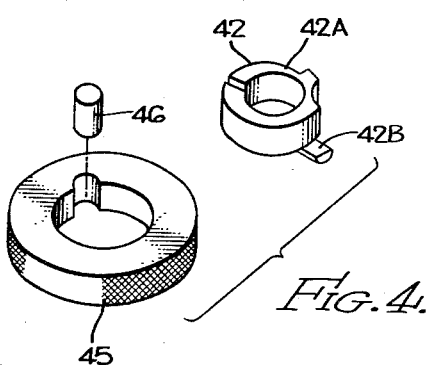
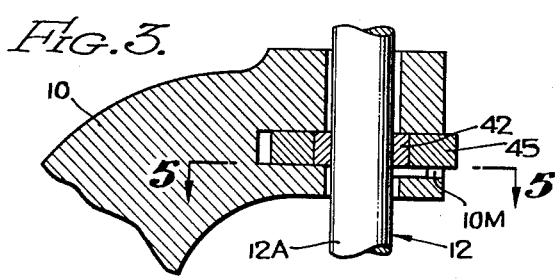
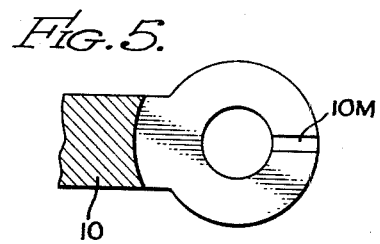
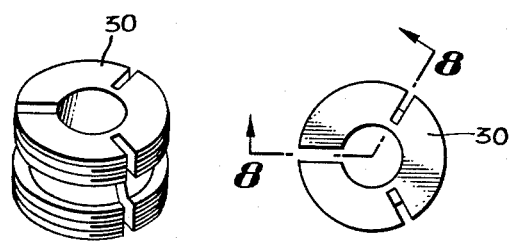
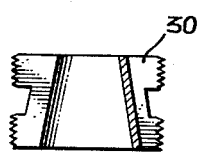
INVENTOR.
MAX L. ENDERS
BY Lyon & Lyon
ATTORNEYS

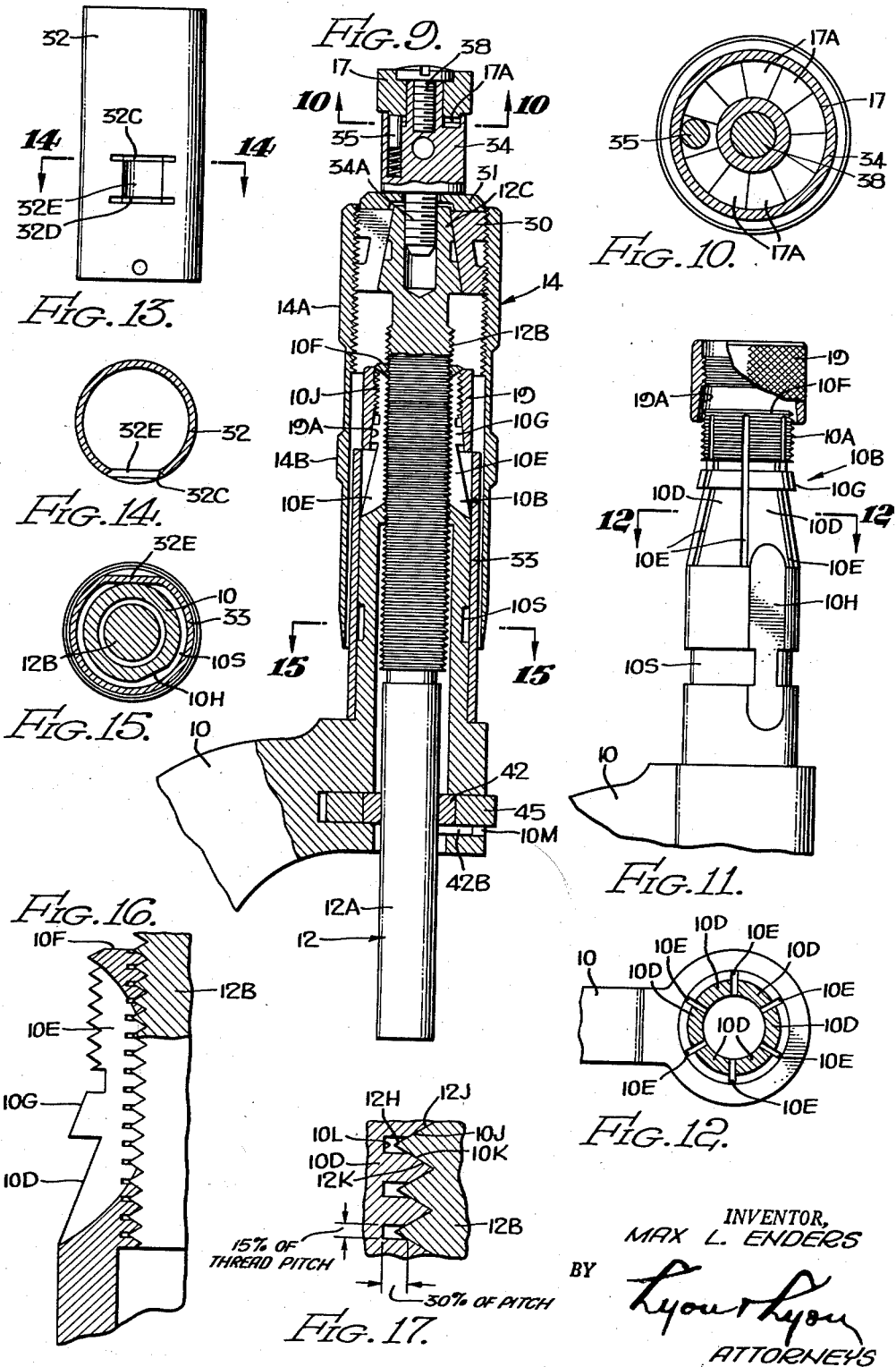

United States Patent Office 2,932,898
Patented Apr. 19, 1960

2,932,898
STRUCTURES USEFUL IN MICROMETER CALIPERS

Max L. Enders, South San Gabriel, Calif.

Application March 12, 1957, Serial No. 645,493

5 Claims. (Cl. 33—164)

The present invention relates to devices which incorporate a screw-threaded element turnable in a nut and is shown herein incorporated in a specific form in a micrometer caliper.

In devices such as micrometer calipers, it is desirable that one revolution or fractional part of revolution of a screw-threaded element, which is turnable in a nut, always results in a predictable axial amount of movement of such element, for purposes of accuracy. This result is not always obtainable in practice because of certain undesirable cooperation between the screw-threaded element and the nut in which the element is turned. In an attempt to obtain this desirable result, various means have been heretofore suggested for taking up the so-called "end play" of the element in the nut by, for example, making the internal diameter of the nut adjustable, at least along a portion of the length thereof, so that the nut portion engages the screw-threaded element more snugly. Such means, as suggested in the prior art, usually involves a slit nut having portions thereof movable and tapered or cammed into engagement with the micrometer screw with the result that only two or three convolutions of the nut thread are pressed into engagement with the micrometer's screw-threaded portion to obtain a fit between these two elements which is not entirely satisfactory, considering the high unit pressures developed along such two or three convolutions and the resulting wear. In accordance with one feature of the present invention, the nut is of special construction and slit portions thereof are moved into engagement with the threads on the micrometer screw so that a greater number of convolutions of the nut thread are uniformly pressed into engagement with the micrometer screw-threaded portion.

Further, in accordance with the present invention, the threads on the nut are undercut at the root of such threads so that a portion of the micrometer screw threads may project into the undercut nut portions so as to minimize wear between the nut and thread so as to preserve accuracy.

It is, therefore, an object of the present invention to provide an improved micrometer caliper.

A specific object of the present invention is to provide a micrometer caliper in which a special nut is provided that cooperates in a special manner with the micrometer screw.

Another specific object of the present invention is to provide an improved construction micrometer caliper in which a nut has an undercut portion at the root of the thread thereof, within which a portion of a threaded element may project.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 illustrates a side view of a device in the form of a micrometer caliper embodying features of the present invention.

Figure 2 is a sectional view taken substantially on the line 2—2 of Figure 1.

Figure 3 is a sectional view taken substantially on the line 3—3 of Figure 2.

Figure 4 is a perspective view of certain elements of the micrometer screw locking mechanism.

Figure 5 is a sectional view taken on the line 5—5 of Figure 3.

Figure 6 is a perspective view of a special locking nut for locking the micrometer screw to the external barrel.

Figure 7 is a top plan view of the nut shown in Figure 6.

Figure 8 is a sectional view taken substantially along the line 8—8 of Figure 7.

Figure 9 is a longitudinal sectional view through a portion of the micrometer illustrated in Figure 1.

Figure 10 is a sectional view taken on the line 10—10 of Figure 9.

Figure 11 is a view in elevation of the upper portion of the frame with the special nut formed integrally with the frame, and also illustrates the tapered sleeve which cooperates with the external threads of the frame nut.

Figure 12 is a sectional view taken substantially on the line 12—12 of Figure 11.

Figure 13 is a view in elevation of a portion of the internal index cylinder.

Figure 14 is a sectional view taken substantially on the line 14—14 of Figure 13.

Figure 15 is a sectional view taken substantially on the line 15—15 of Figure 9.

Figure 16 shows, in enlarged form, the nature of the internal screw threads of the frame nut in relationship to the externally screw-threaded portion of the micrometer screw.

Figure 17 illustrates, in enlarged form, a portion of the structure shown in Figure 16.

The micrometer caliper illustrated in the drawings illustrates a frame 10 carrying a cylindrical anvil 11 which is axially aligned with the cylindrical shank of the micrometer lead screw 12. The lead screw 12 is rotated within the frame 10 by an operator turning the outer barrel 14 having the knurled portions 14A and 14B thereon; or, alternatively, under certain conditions, by rotating the axially aligned knurled knob 17 which is coupled to the barrel 14 through a friction connection.

The micrometer lead screw 12 has a cylindrical shank 12A of reduced diameter and is provided with a precision screw-threaded portion 12B as well as a conical end portion 12C. The screw-threaded portion 12B cooperates in a novel manner, characterizing features of the present invention, with an internally screw-threaded portion of a flat nut 10B. The nut 10B is formed integrally with the flat 10H and is threaded internally for cooperation with the lead screw 12 and is also threaded externally for cooperation with a tapered internally threaded sleeve 19.

The nut 10B is of special construction in that an intermediate portion only of the nut, in the form of an internally threaded sleeve, is slit to provide six equal portions 10D, as illustrated in Figure 12. These portions are separated by six slots 10E. These slots 10E, as carefully observed in Figure 11, extend upwardly and terminate near the upper rim 10F of the nut which is left intact. This nut 10B also carries on the external face thereof a tapered portion 10G that is likewise slit and positioned for cooperation with the internally tapered portion 19A of the sleeve 19. When the sleeve 19 is threaded on the external threads 10A of the nut 10B, the tapered portion 19A cooperating with the segmented tapered portion 10G serves to press and move the segmented portions of the nut into snug engagement with the threaded portion of the micrometer lead screw. It is noted that the tapered portion 10G is located substantially midway between the ends of the slotted portions 10D so that this aforementioned camming movement results in a more uniform movement of a large number of internal convolutions of the nut thread into more snug engagement with the lead screw.

In accordance with an important feature of the present invention, the threaded portion 12B, as illustrated in Figure 17, comprises a sharp V thread with a sharp razor-like apex 12H. This thread has two converging faces 12J and 12K that converge at the apex 12H. The nut 10D is provided with a pair of faces 10J and 10K that conform with the aforementioned faces 12J and 12K, but the base of the nut thread is provided with a generally rectangular cross-sectioned groove 10L to provide relief and clearance for the sharp apex 12H. This relief slot 10L may have a horizontal dimension, as indicated, which is 30% of the thread pitch, and may have a vertical dimension which is 15% of the thread pitch.

While it is appreciated that it is difficult to make a sharp V thread, as shown in Figure 17, the same may be produced for all practical purposes where precision is required. Use of a sharp V thread has heretofore been avoided because the razor-like apex of a theoretical V thread would break off at the first use and the screw thread lose its size immediately. Because of this, various micrometers have from time to time adopted certain modifications of the theoretical V form (allowing a flat at both top and bottom of the thread) which seemed to meet their own requirements.

The lead screw 12 has secured thereto the outer barrel 14 of a calipering arrangement which includes the internally tapered sleeve 30, washer 31, and the threaded post 34, such post having a threaded shank 34A which is threaded in the lead screw 12 with the washer 31 disposed between the post 34 and the sleeve 30. Tightening of the post 34 causes greater pressure to be exerted between the cooperating conical mating surfaces of the sleeve 30 and the lead screw 12. The barrel 14 has internal screw threads cooperating with the external screw threads on the sleeve 30 so as to be secured thereby. This barrel 14 carries at the lower end thereof suitable conventional index marks 14B which cooperate with index marks 32A on the internal sleeve 32 which is adjustably mounted on the frame 10 in the manner now described.

The index sleeve 32, as shown in Figures 13, 14 and 15, is slotted at 32C and 32D and the portion 32E therebetween is flattened, as indicated in Figure 14, so as to cause it to cooperate with the flat 10H (Figure 11) and the slotted portion 10S in the frame 10. The axial length of the flat portion 32E is slightly less than the width of the slot 10S. In the assembly the index sleeve 32 is slipped over the sleeve portion of the frame 10 with the flat 10H providing the desired clearance for the flat portion 32E. When the sleeve 32 is thus inserted to a point where the flat portion 32E is adjacent the annular slotted portion 10S, the sleeve 32 is rotated so that the frame portion 32E rides within the slotted portion 10S. This flattened portion 32E is resilient to a sufficient degree as to provide frictional engagement with the bottom of the slot 10S so that the index drum 32 may be rotated about its axis to an adjusted position. This sleeve 32 is thus adjusted so that a "0" reading is obtained when the shank of the lead screw 12 abuts the anvil 11.

As is conventional, the knurled knob 17 may be mounted on the post 34 so ts to produce uniformity in use of the calipers. The underside of the knob 17 is provided with radial grooved portions 17A, as shown in Figure 10, which cooperate with a spring pressed pin 35 which is guided in the post 34. This knob 17 is retained on the post 34 by the shoulder of the screw 38.

The lead screw 12 may be locked with respect to the frame 10 using the structure illustrated in connection with Figures 2, 4 and 9. The lead screw 12 passes through the modified ring 42 which has an external cam surface 42A and which has secured thereto a small pin 42B which is recessed in a groove 10M (Figure 9) of the frame to secure the ring 42 to the frame. The knurled locking ring 45 is modified to receive the locking pin 46 which cooperates with the aforementioned cam surface 42A. Thus, when the locking ring 45 is rotated, the pin 46 is carried therewith, so that such pin 46 may bind between the cam surface 42A and the ring 45, thereby locking the lead screw respectively.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a device of the character described, a lead screw, a nut having an external threaded portion and an internal threaded portion, said nut having two end portions, said nut being slit longitudinally to define a plurality of spaced portions each integral with said end portions, said nut having an annular cam face thereon, a tapered sleeve mounted on said externally threaded portion and having a portion thereof engageable with said cam face, said annular cam face being on said plurality of spaced portions and substantially midway between the ends thereof for camming said internal screw threaded portion into engagement with said lead screw.

2. In an arrangement as set forth in claim 1 in which said lead screw has a thread thereon substantially V-shaped in cross section, and said internally threaded portion of said nut having faces thereon engageable with the faces of said V-shaped thread and the base of the thread on the nut be relieved to provide clearance for the apex of said substantially V-shaped thread.

3. In a micrometer caliper, a frame, an upper tubular portion extending from said frame and formed integrally therewith, an indexing barrel mounted on said tubular portion, said tubular portion having a flat thereon extending generally longitudinally of said tubular portion, said tubular portion having an annular outer circular groove therein in communication with said flat, said indexing drum having a flat portion thereof slidable over said flat on said tubular portion and being rotatable with said flat portion thereon engageable with said annular groove, the flat on said barrel and said annular groove cooperating frictionally to maintain said indexing barrel in adjusted position.

4. In a micrometer construction, a lead screw, a nut encircling the threaded portion of said lead screw, said nut having two spaced end portions and a plurality of deformable portions connected at opposite ends to said end portions, cam means mounted externally of said nut substantially midway between said end portions and means engageable with said cam means for moving intermediate portions of said nut portions into snug engagement with said lead screw.

5. The arrangement as set forth in claim 4 in which said lead screw has substantially a V-shaped thread and said nut has a pair of converging surfaces engageable with the faces of said V thread and said nut having an annular groove at the base of the thread thereof to provide clearance for the apex of the V thread without touching the same.

References Cited in the file of this patent

UNITED STATES PATENTS

| | | |
|---|---|---|
| 717,296 | Spalding | Dec. 30, 1902 |
| 873,626 | Starrett | Dec. 10, 1907 |
| 1,551,154 | Janik | Aug. 25, 1925 |
| 2,212,910 | Witchger | Aug. 27, 1940 |
| 2,567,483 | Hotine | Sept. 11, 1951 |
| 2,791,034 | Handy | May 7, 1957 |